(12) United States Patent
Brenninger et al.

(10) Patent No.: US 11,498,160 B2
(45) Date of Patent: Nov. 15, 2022

(54) BOLT FOR FASTENING COMPONENTS, OR THE GROUND CONNECTION OF ELECTRICAL OR ELECTRONIC COMPONENTS, ON A VEHICLE BODY, A BOLT ARRANGEMENT HAVING A BOLT, AND A METHOD FOR FORMING THE BOLT ARRANGEMENT

(71) Applicant: Bayerische Motoren Werke Aktiengesellschaft, Munich (DE)

(72) Inventors: Gerhard Brenninger, Schwindkirchen (DE); Thomas Engelberger, Au i.d. Hallertau/Osterwaal (DE); Hannes Vasold, Schweitenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 853 days.

(21) Appl. No.: 16/413,849

(22) Filed: May 16, 2019

(65) Prior Publication Data

US 2019/0270167 A1 Sep. 5, 2019

Related U.S. Application Data

(63) Continuation of application No. PCT/EP2018/051152, filed on Jan. 18, 2018.

(30) Foreign Application Priority Data

Mar. 10, 2017 (DE) ..................... 10 2017 203 984.1

(51) Int. Cl.
*B23K 35/02* (2006.01)
*F16B 37/06* (2006.01)
(Continued)

(52) U.S. Cl.
CPC ........ *B23K 35/0288* (2013.01); *F16B 37/061* (2013.01); *F16B 2001/0064* (2013.01); *H01R 4/64* (2013.01); *H01R 2201/26* (2013.01)

(58) Field of Classification Search
CPC .............. B23K 35/0288; F16B 37/061; F16B 2001/0064; H01R 4/64; H01R 2201/26
(Continued)

(56) References Cited

U.S. PATENT DOCUMENTS

2013/0081252 A1 4/2013 Markgraf et al.
2015/0001189 A1 1/2015 Spinella et al.
(Continued)

FOREIGN PATENT DOCUMENTS

CN 1976777 A 6/2007
CN 201661567 U 12/2010
(Continued)

OTHER PUBLICATIONS

Chinese-language Office Action issued in Chinese Application No. 201880004909.0 dated Jan. 21, 2021 with English translation (15 pages).
(Continued)

*Primary Examiner* — William H. Mayo, III
*Assistant Examiner* — Krystal Robinson
(74) *Attorney, Agent, or Firm* — Crowell & Moring LLP

(57) ABSTRACT

A bolt is provided for fastening a component or a ground connection of electrical or electronic components to a vehicle body. The bolt has a head portion with an external thread, the head portion being formed from a steel material, and a foot portion. The foot portion is formed from an aluminum alloy and is connected integrally to the head portion by a friction-weld connection. The bolt is configured
(Continued)

in the form of a welding stud for drawn arc stud welding, for which purpose it has an ignition tip on its end side, which delimits the foot portion.

11 Claims, 1 Drawing Sheet

(51) Int. Cl.
*F16B 1/00* (2006.01)
*H01R 4/64* (2006.01)

(58) Field of Classification Search
USPC .......................................................... 411/171
See application file for complete search history.

(56) References Cited

U.S. PATENT DOCUMENTS

| | | | | |
|---|---|---|---|---|
| 2015/0204370 | A1* | 7/2015 | Serizawa | F16B 33/02 411/411 |
| 2015/0233461 | A1* | 8/2015 | Weigold | F16H 57/023 74/425 |

FOREIGN PATENT DOCUMENTS

| | | | |
|---|---|---|---|
| CN | 102619857 A | 8/2012 | |
| CN | 103032273 A | 4/2013 | |
| CN | 104249215 A | 12/2014 | |
| CN | 105715652 A | 6/2016 | |
| DE | 299 08 831 U1 | 7/1999 | |
| DE | 299 11 121 U1 | 11/2000 | |
| DE | 10 2004 050 675 A1 | 4/2006 | |
| DE | 10 2008 031 785 A1 | 1/2009 | |
| EP | 1 008 416 A1 | 6/2000 | |
| EP | 1 072 352 A1 | 1/2001 | |
| EP | 1 072 352 B1 | 1/2005 | |
| EP | 3053679 A1 * | 8/2016 | .............. B22F 7/062 |

OTHER PUBLICATIONS

International Search Report (PCT/ISA/210) issued in PCT Application No. PCT/EP2018/051152 dated Apr. 5, 2018 with English translation (eight (8) pages).
German-language Written Opinion (PCT/ISA/237) issued in PCT Application No. PCT/EP2018/051152 dated Apr. 5, 2018 (five (5) pages).
Chinese-language Office Action issued in Chinese Application No. 201880004909.0 dated Jun. 10, 2021 with English translation (14 pages).
Chinese-language Office Action issued in Chinese Application No. 201880004909.0 dated Jun. 18, 2020 with English translation (14 pages).
German-language Office Action issued in counterpart German Application No. 10 2017 203 984.1 dated May 22, 2019 (five (5) pages).
German-language Search Report issued in counterpart German Application No. 10 2017 203 984.1 dated May 22, 2019 with English translation (13 pages).

* cited by examiner

BOLT FOR FASTENING COMPONENTS, OR THE GROUND CONNECTION OF ELECTRICAL OR ELECTRONIC COMPONENTS, ON A VEHICLE BODY, A BOLT ARRANGEMENT HAVING A BOLT, AND A METHOD FOR FORMING THE BOLT ARRANGEMENT

CROSS REFERENCE TO RELATED APPLICATIONS

This application is a continuation of PCT International Application No. PCT/EP2018/051152, filed Jan. 18, 2018, which claims priority under 35 U.S.C. § 119 from German Patent Application No. 10 2017 203 984.1, filed Mar. 10, 2017, the entire disclosures of which are herein expressly incorporated by reference.

BACKGROUND AND SUMMARY OF THE INVENTION

The invention relates to a bolt for fastening components, or the ground connection of electrical or electronic components, to a vehicle body. The invention also relates to a bolt assembly having the bolt, and to a method for configuring the bolt assembly.

It is known for bolts to be welded to a vehicle body. The bolts (studs) are welded to the body by way of the feet of said bolts. The bolts, on the free end thereof, have a threaded portion onto which the components to be assembled are plug-fitted. The components are fixed by Threading a nut onto the threaded portion. When the bolts are so-called ground bolts, thus bolts which are used for grounding electrical or electronic components in the vehicle, ground lines are thus plug-fitted onto the bolt and clamped between the nut and a contact face of the ground bolt, electrical contact being generated on account thereof.

When vehicle bodies are made from steel, bolts from steel are thus used. Lightweight construction materials are increasingly used in the context of lightweight construction. However, in the case of vehicles having aluminum bodies, the attachment of bolts, and in particular the link for grounding, are a challenge. Welding conventional steel bolts to aluminum is not readily possible by virtue of the dissimilar material properties.

It is already known for steel bolts to be welded to an aluminum panel portion by means of friction welding and for the aluminum panel portion to subsequently be welded to the body or the chassis of the vehicle by arc welding. However, this method is labor-intensive and cost-intensive, and is capable of automation to only a limited extent.

It is furthermore known for ground bolts from aluminum to be used. However, while said aluminum bolts are readily weldable to an aluminum body, the long-term durability of the screw-connection is questionable. Moreover, aluminum bolts often establish the electrical contact to an inadequate extent since the coefficient of friction of the aluminum-to-aluminum screw connection between the nut and the bolt is not defined. When screw-fitting an aluminum screw fitting there is the risk of the aluminum being welded. In order for the latter to be prevented, a lubricant which in turn reduces the electrical contact is used. Moreover, the electrical contact is compromised on account of the formation of oxide on the aluminum. However, the reliable ground connection of electrical and electronic components to the body is however decisive in terms of the flawless functioning of said electrical and electronic components in the vehicle.

It is therefore an object of the present invention to provide an improved bolt assembly, and in particular an improved ground contact, that is capable of being produced in a manner suitable for the large-scale production of a vehicle having an aluminum body.

According to the invention, a bolt is provided having a head portion with an external thread, said head portion being formed from a steel material, and a foot portion. The head portion, by way of the external thread thereof, provides a fastening possibility. When the bolt is to be used as a ground bolt, contact with the electrical connector element such as, for example, a contact shoe of a ground cable, is established at the head portion. The connector element will be plug-fitted onto the external thread of the bolt, for example. The connector element, on account of a nut being threaded on the external thread, is clamped between the nut and a contact face of the head portion, and the electrical contact is achieved.

The fastening of the bolt to the vehicle body is performed at the foot portion. According to the invention, the foot portion is configured from an aluminum alloy and, at an end side, is connected in a materially integral manner to the head portion by way of a friction-welded connection. The bolt is configured as a welding bolt (welding stud) for stroke-ignition welding (drawn are stud welding), to which end said bolt on the end side thereof that delimits the foot portion has an ignition tip. The end side of the foot portion can preferably be configured so as to be conical, for example, wherein the ignition tip in relation to the remaining foot portion projects in the longitudinal direction of the bolt.

The hybrid bolt according to the invention enables fusion welding of materials of the same type on an aluminum component and the use of a standard welding method. The aluminum foot is welded to the aluminum body. The hybrid bolt can preferably be designed such that bolt welding devices, which previously have been used for stroke-ignition welding of steel bolts to steel bodies, can advantageously be used without major modifications also in conjunction with the bolt according to the invention and with aluminum bodies.

The hybrid bolts can be fed to the joint in a fully automatic manner by way of a conventional bolt feeding device. The head portion having the steel thread and the steel contact face guarantees a durable strong screw-fitment. When the bolt in one design embodiment is a ground bolt, the head portion configured from a steel material thus enables improved electrical contact and a durable strong pretensioning of the cable connector by way of a defined transition resistance.

The bolt in one preferred design embodiment on the steel side and the aluminum side has in each case key faces for engaging a tool. For example, at least two mutually opposite key faces can be provided on the foot portion of the bolt, and at least two mutually opposite faces can be molded on the head portion. In order for the key face to be implemented, the foot portion on the circumference can have, for example, a polygonal, in particular hexagonal, external contour; a polygonal, in particular hexagonal, external contour can likewise be molded on the head portion, for example so as to neighbor the external thread. The provision of key faces both on the aluminum-side portion as well as on the steel-side portion of the bolt enables simple and destruction-free testing of the friction-welded connection between the steel and the aluminum material, in particular testing of all bolts to the extent of 100%.

In one design embodiment it can be advantageous for the foot portion in a region that is contiguous to the end face to be configured so as to be cylindrical. The welding result can be improved on account thereof, since any undesirable straying of the arc is prevented while the bolt is welded to the body.

When the ground line, or the ground shoe, respectively, is plug-fitted onto the external thread of the head portion and a nut is screw-fitted, the nut clamps the ground line against a contact face which is formed by a bearing flange which projects radially in relation to the external thread. The bearing face is advantageously at least in portions provided with a knurling, on account of which an anti-rotation safeguard of the ground connection is guaranteed.

The bolt according to the invention can be produced by simple means. The bolt in one design embodiment is thus produced in that a conventional steel bolt which by way of the end side thereof that faces away from the thread is friction-welded to an aluminum profile portion having a hexagonal external contour is used. The steel bolt herein can be a bolt such as is conventionally used for contacting steel bodies. The external thread of the bolt can preferably be an M6, M8, or M10 thread. The steel bolt can optionally be provided with a surface coating such as, for example, a tin/zinc Sn/Zn 70/30 coating, in order for the electrical conductivity to be increased and the welding capability to be improved. Friction-welded connections between aluminum and steel materials can be embodied by way of a reliable process and so as to have high connection strengths.

A solid polygonal, for example hexagonal, standard aluminum profile which is cut to length can be used for the foot portion, for example. The ignition tip required for welding can be produced by turning the end side, for example.

All welding-capable aluminum alloys, for example aluminum alloys having a magnesium proportion of less than 3% by weight and a silicon proportion of less than or equal to 1% by weight, are suitable as materials for the foot portion. Series 5000 and 6000 aluminum alloys are particularly suitable, and EN AW 6082 is particularly preferably used.

In a coordinated aspect, a bolt assembly for fastening a component, or for the ground connection of electrical or electronic components, to a vehicle body is furthermore provided, said bolt assembly having a bolt having a head portion with an external thread, said head portion being configured from a steel material, and a foot portion which is configured from an aluminum alloy and is connected in a materially integral manner to the head portion by way of a friction-welded connection. The bolt, on an end side of the foot portion, is welded to an aluminum component, in particular an aluminum body, by means of stroke-ignition welding. The bolt is preferably the bolt according to the invention as has been described above; to this extent, the same technical effects and advantages are achieved.

Furthermore provided is a method for producing a contact assembly for the ground connection of electrical or electronic components to a vehicle body, in which method a ground bolt according to the invention at the end side of said bolt is welded to an aluminum component, and in particular to an aluminum body. The welding is preferably performed by means of stroke-ignition welding, wherein resistance welding or laser welding would also be possible. In the case of stroke-ignition welding, the bolt by way of the end face thereof is first placed on the workpiece. The bolt, by way of a stroke mechanism in the welding gun or the welding head, is then slightly raised, and a pilot arc having a minor amperage is ignited between the ignition tip and the workpiece. The ignition of the main arc is subsequently performed by increasing the amperage. The bolt and the workpiece are melted. The bolt, after a defined welding time, is moved back to the workpiece and plunges into the weld pool created. The welding current is switched off, and the melt solidifies and cools. The bolt and the workpiece are connected in a materially integral manner.

The bolt described above is used in the method, so that the same technical advantages and effects are achieved as have been described in the context of the bolt.

The properties, features, and advantages described above of this invention, and the manner in which said properties, features, and advantages are achieved, will become more evident and more clearly understandable by means of the drawing and in conjunction with the description hereunder of the exemplary embodiments. To the extent that the term "can" is used in this application, this refers to both the technical potential as well as to the actual technical implementation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
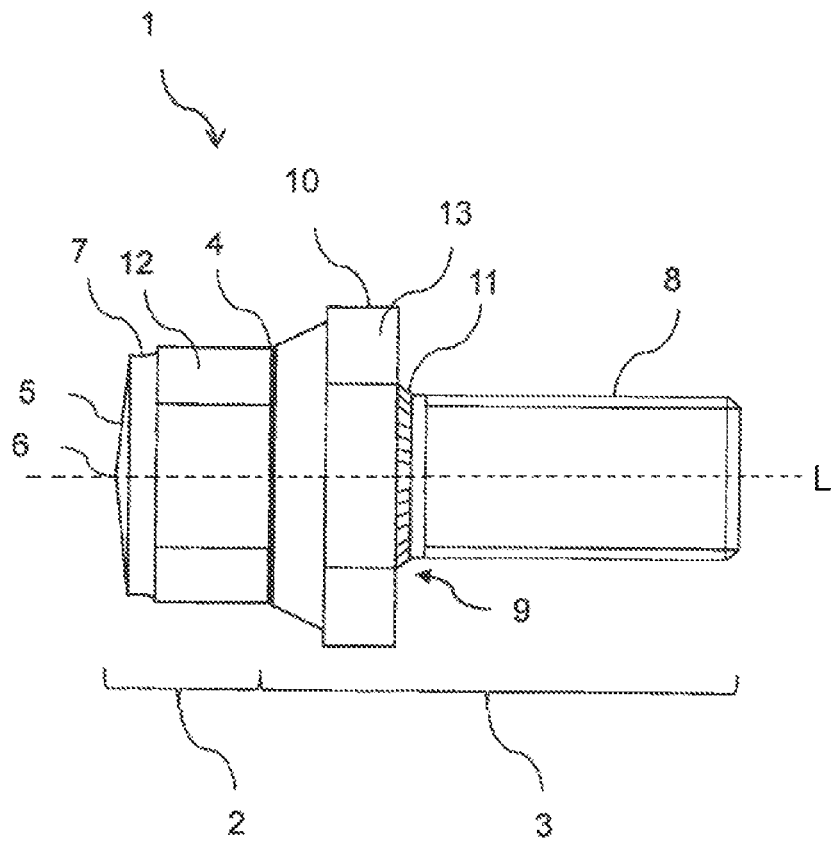
FIG. 1 is a lateral view of an exemplary bolt.

FIG. 1 shows an exemplary bolt in the form of a ground bolt for the ground connection of electrical or electronic components to a vehicle body. The ground bolt 1 extends along a longitudinal axis L and is configured as a hybrid bolt, that is to say that said bolt comprises a foot portion 2 from an aluminum material and a head portion 3 from a steel material. The foot portion 2 and the head portion 3 are connected to one another in a materially integral manner by way of a friction-welded connection 4.

The foot portion 2 serves for fastening the ground bolt to a vehicle body. The foot portion 2 is formed by a prism-shaped member, having an hexagonal cross-sectional face (transverse to the longitudinal axis L) with legs of equal length. The foot portion 2 at the free end face 5 thereof is configured so as to be conical, having a projecting ignition tip 6. In order to prevent any straying of the arc when welding the ground bolt 1, the foot portion 2 in a portion 7 that is contiguous to the end face 5 is provided with a chamfer and in this region has a cylindrical shape. The cylindrical portion 7 preferably has a length L1 of at least 2 mm. The foot portion 2 of the ground bolt is formed by a solid aluminum member from a welding-capable aluminum alloy, on account of which welding to an aluminum body is ensured by way of a reliable process.

The head portion 3 serves for the assembly of ground connections (not shown). To this end, an external thread 8 onto which the ground connections to be connected are capable of being plug-fitted is provided on the head portion. By threading a nut (not illustrated) onto the external thread 8 of the head portion 3, the ground connections are pressed onto a contact face 9 and clamped between the latter and the nut. The contact face 9 is formed by a bearing flange 10 which is contiguous to the external thread 8 and, in relation to the latter, projects in a radially outward manner. The external thread 8 and the contact face 9 are configured from steel, on account of which outstanding electrical contact properties and a durable screw-fitment can be ensured. In order for an anti-rotation safeguard of the ground lines, or of the plug-fitted ground shoe, respectively, to be achieved, the ground bolt 1 in the region of the contact face 9 can be provided with a knurling 11.

The ground bolt shown is capable of being produced in a simple manner. The foot portion 2 can be generated by cutting-to-length an aluminum profile, available by the yard/meter, having a hexagonal cross section, wherein the conical end face 5 and the circumferential chamfer adjoining the latter at least on one end side, preferably on both end sides, is generated by turning, for example. The total length L2 of the foot portion 2 is capable of being individually set and can be, for example, at least 8 mm or at least 10 mm. The foot portion 2 is preferably provided with a conversion coating (Aludine), on account of which the formation of oxide is decelerated and a defined layer of oxide improves the welding capability and the storage capability.

The foot portion thus generated is welded to a conventional steel bolt by means of friction welding, for example, wherein the foot portion by way of one end side is welded to the bolt head of the steel bolt such that the hybrid bolt shown in FIG. 1 is created.

A bolt having an external hexagon is preferably used as the steel bolt. Key faces 12, 13 are in each case thus provided both on the steel side as well as on the aluminum side, so that simple testing of the friction-welded connection is possible by applying a torque by means of suitable tools such as, for example, wrenches.

Figure 2:
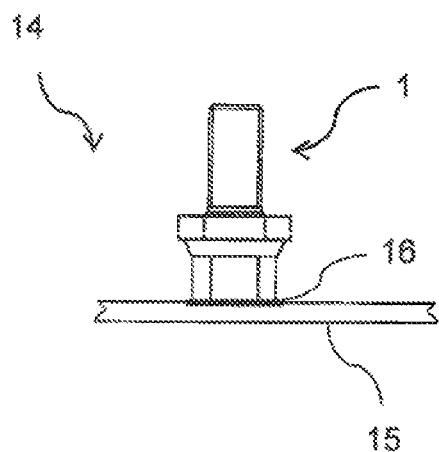
FIG. 2 is a schematic illustration of a bolt assembly having the bolt from FIG. 1.

The ground bolt thus produced can be readily welded to aluminum bodies by means of stroke-ignition welding. FIG. 2 shows an exemplary bolt assembly 14, wherein the bolt 1 from FIG. 1, at the end side 5 of said bolt 1, by means of stroke-ignition welding has been welded to an aluminum component 15 which is part of a vehicle body. The resulting welded connection 16, by virtue of the aluminum foot portion used, is a weld of materials of the same type. The ground bolt 1 can be readily processed using conventional stroke-ignition welding systems having automated bolt feeding devices.

The exemplary embodiments are not true to scale and not limiting. Modifications in the context of any action by a person skilled in the art are possible.

LIST OF REFERENCE SIGNS

1 Bolt
2 Foot portion
3 Head portion
4 Friction-welded connection
5 End face
6 Ignition tip
7 Cylindrical portion
8 External thread
9 Contact face
10 Bearing flange
11 Knurling
12, 13 Key face
14 Bolt assembly
15 Aluminum component
16 Stroke-ignition welded connection
L Longitudinal axis
L1, L2 Length The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bolt for fastening a component or a ground connection of electrical or electronic components to a vehicle body, comprising:
    a head portion having an external thread, said head portion being configured from a steel material; and
    a foot portion being configured from an aluminum alloy; and
    a friction-weld that connects the foot portion to the head portion in a materially integrated manner, wherein
    the bolt is configured as a welding bolt for stroke-ignition welding,
    an end face of the bolt that delimits the foot portion has an ignition tip,
    the foot portion has a cylindrical section that adjoins the end face, and
    the foot portion has an aluminum profile section with a hexagonal outer contour, and the aluminum profile section is friction-welded to the head portion.

2. The bolt according to claim 1, wherein
    a bolt is a ground bolt, wherein both the head portion and the foot portion have key faces for engaging a tool.

3. The bolt according to claim 1, wherein
    the head portion has a bearing flange which protrudes outward in relation to the external thread and has a contact face, a ground connection that is plug-fitted onto the external thread being capable of being clamped on said contact face by screw-fitting a nut, wherein the contact face is at least in portions provided with a knurling.

4. The bolt according to claim 1, wherein
    the foot portion is configured from a 6000 series aluminum alloy.

5. A method for producing a bolt assembly for fastening a component or a ground connection of electrical or electronic components to a vehicle body, the method comprising the acts of:
    providing a bolt according to claim 1;
    providing an aluminum component; and
    welding the bolt at an end side thereof to the aluminum component.

6. The method according to claim 5, wherein the welding is carried out via stroke-ignition welding.

7. A bolt assembly for fastening a component or a ground connection of electrical or electronic components to a vehicle body, said bolt assembly comprising:
    a bolt having a head portion with an external thread, said head portion being configured from a steel material, and a foot portion which is configured from an aluminum alloy and is connected in a materially integral manner to the head portion by way of a friction-welded connection, and
    an aluminum component, wherein an end side of the foot portion is welded to the aluminum component by stroke-ignition welding, wherein
    the foot portion has a cylindrical section that adjoins an end face of the bolt that delimits the foot portion, and
    the foot portion has an aluminum profile section with a hexagonal outer contour, and the aluminum profile section is friction-welded to the head portion.

8. The bolt assembly according to patent claim 7, wherein the bolt has an ignition tip on the end face to facilitate the stroke-ignition welding.

9. The bolt assembly according to claim 8, wherein the bolt is a ground bolt, wherein both the head portion and the foot portion have key faces for engaging a tool.

10. The bolt assembly according to claim 8, wherein the head portion has a bearing flange which protrudes outward in relation to the external thread and has a contact face, a ground connection that is plug-fitted onto the external thread being capable of being clamped on said contact face by screw-fitting a nut, wherein the contact face is at least in portions provided with a knurling.

11. The bolt assembly according to claim 8, wherein the foot portion is configured from a 6000 series aluminum alloy.

* * * * *